United States Patent Office
3,245,933
Patented Apr. 12, 1966

3,245,933
STYRENE-MALEIC ANHYDRIDE COPOLYMERS CROSS-LINKED WITH ALIPHATIC POLYHYDROXY COMPOUNDS
Irving E. Muskat, Miami, Fla., assignor, by mesne assignments, to Sinclair Research, Inc., a corporation of Delaware
No Drawing. Filed May 19, 1960, Ser. No. 30,060
23 Claims. (Cl. 260—29.6)

The present invention relates to the cure of maleic copolymers with aliphatic polyhydroxy compounds as cross-linking agents. While the invention includes various utilities, including molding compositions, it is particularly concerned with compositions which are adapted to deposit films which may be thermoset, normally by exposure to elevated temperatures. The invention is especially directed to coating compositions in which the film forming components are present in water solution.

In accordance with the invention, a copolymer partial half ester having the formula:

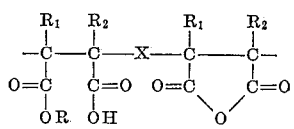

in which R is a residue of monofunctional monohydroxy organic compound, preferably certain selected aliphatic monohydric alcohols; $R_1$ and $R_2$ are selected from the group consisting of hydrogen, alkyl, aryl and aralkyl radicals containing up to 8 carbon atoms, and halogen, and in which X designates an intermediate portion of the copolymer molecule, is mixed with an aliphatic polyhydroxy compound as cross-linking reactant. Preferably, the copolymer in its hydrolyzed form, and at least partially neutralized with ammonium hydroxide or lower alkyl-substituted ammonium hydroxide, is dissolved in water with a water-soluble or water-dispersible aliphatic polyhydroxy compound, preferably in the further presence of a modifying component which is either an amine or which contains methylol groups. As will more fully appear hrereinafter, the extent of partial half esterification can be varied within a range to be defined in order to develop maximum properties of chemical stability including resistance to weathering as well as the development of superior electrical characteristics. Additionally, proportions and the selection of the alcohol used to form the partial half ester are important, especially for the production of flexible, baked thermoset coatings. Still further, the use of amine or methylol-containing modifiers in the proportions to be defined is beneficial for the production of superior films, especially from water medium.

The partially half esterfied copolymers which are useful in the invention may be provided in various ways. Desirably, the partially half esterified copolymers are formed from maleic anhydride copolymers having a low molecular weight. Low molecular weight copolymers as the hydrolyzed product which is at least partially reacted with ammonium hydroxide or lower alkyl-substituted ammonium hydroxide to form salts are more soluble in water and have very low viscosity characteristics which are important for commercial use.

More particularly, the copolymers which are desirably formed as a starting material are copolymers of olefins with maleic anhydride, the term "maleic anhydride" identifying anhydrides having the formula:

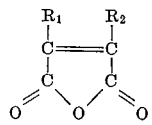

in which $R_1$ and $R_2$ are selected from the group of hydrogen, alkyl, aryl and aralkyl radicals containing up to 8 carbon atoms, and halogen. Thus, maleic anhydride, methyl maleic anhydride, phenyl maleic anhydride, dimethyl maleic anhydride and chlormaleic anhydride are particularly contemplated. Maleic anhydride is preferred.

Useful olefins for copolymerization with the maleic anhydride are those having the general formula:

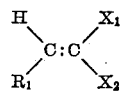

where $R_1$ represents a hydrogen atom or a hydrocarbon radical selected from the group of alkyl and unpolymerizable alkene radicals which may or may not be substituted by halogen, oxygen, nitrogen, etc. atoms, and where $X_1$ and $X_2$ may be an activating atom or radical selected from the group consisting of hydrogen atom, halogen atom, and alkoxy, aryloxy, alkaryloxy groups and acetyl, alkyl, substituted alkyl, alicyclic, substituted alicyclic, aromatic and nuclear hydrogen substituted aromatic radicals.

The preferred form of olefins are those having a single double bond and the the general formula:

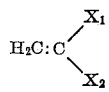

where $X_1$ and $X_2$ are activating atoms of the types described in the general formula above. Such mono-olefins are illustrated by the compounds, for example, vinyl halides, vinyl ethers, vinyl acetate, vinyl naphthalene, styrene, alkyl styrenes, and halogen substituted styrenes in which two of five of the nuclear hydrogen atoms are replaced by halogen and the like. Simple olefin hydrocarbons may be used, especially the lower olefins such as ethylene, propylene and the various butylenes.

The preferred starting copolymers are low molecular weight copolymers of styrene and maleic anhydride in molar proportions of from 1:2 to 2:1, preferably substantially 1:1. By low molecular weight is meant normally solid copolymers, especially those of styrene and maleic anhydride having a solution viscosity in 10% solution in acetone of up to 7 centistokes, preferably up to 1 centistoke. All solution viscosities are measured at 25° C. and a 10% solution designates 10 grams of polymer dissolved in acetone to form 100 milliliters of solution. The preferred copolymers of maleic anhydride and styrene also have melting points of less than 255° C., preferably less than 225° C. and desirably melt over a range of up to 15° C. Melting points and melting range are determined using the Fisher-Johns melting point apparatus. Also, the preferred copolymers may be terminated by up to about 12% by weight of a chain terminating solvent which is desirably an alkyl-substituted aromatic organic compound in which the alkyl substituent contains at least two carbon atoms, the alpha carbon atom containing at least one hydrogen substituent, e.g., an isopropyl substituted benzene.

A more extensive description of preferred low molecular weight copolymers useful as base or starting copolymers in accordance with the invention and the production thereof is contained in my copending applications Serial Nos. 849,706 and 849,704, both filed October 30, 1959 (now respectively U.S. Patent 3,085,994, granted April 16, 1963, and U.S. Patent 3,178,395 granted April 13, 1965), and these disclosures are hereby incorporated by reference.

Irrespective of the specific nature of the base copolymer, it contains a plurality of maleic anhydride residues having the formula:

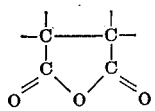

and these are partially half esterified to convert a portion of the anhydride groups to half-ester groups in accordance with the equation:

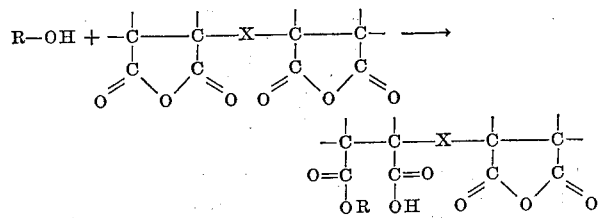

in which R designates the residue of monofunctional monohydroxy organic compound, preferably an aliphatic monohydric alcohol and X designates an intermediate portion of the copolymer molecule.

This reaction is effected by heating the monohydroxy compound with the anhydride copolymer, preferably in the absence of solvent or catalyst in order to best enable partial half esterification without destruction of those anhydride groups which are not converted to the half ester and to avoid the need for removal of catalyst and solvent. The extent of partial esterification may be controlled by predetermining the amount of monohydroxy compound used or by supplying excess monohydroxy compound and terminating the reaction when the acid number of the copolymer has decreased to the extent desired.

It should be noted, particularly with low molecular weight anhydride copolymers, that the copolymer may include significant proportions of chemically bound terminating solvent (up to about 12% by weight). As a result, the anhydride content of the copolymer should be determined by accurate titration and not estimated from the proportions of reactants used in making the copolymer.

The extent of esterification should be controlled to convert from 10–80%, and preferably from 40–75%, of the anhydride groups to the half-ester, leaving the remaining anhydride groups unmodified. If water solution application is contemplated, the remaining anhydride groups are hydrolyzed with water, ammonium hydroxide or lower alkyl substituted ammonium hydroxide. The use of partial half esterification in the invention limits the opportunity for cross-linking by the polyhydroxy compound. It is important to note that excessive half esterification prevents adequate cross-linking while insufficient half esterification causes the mixture of copolymer and polyhydroxy compound to yield a highly cross-linked and rigid product and to cure too rapidly so that the product sets up and becomes immobile before all of the reactive carboxyl functionality of the copolymer is satisfied. As a result, the cross-linked product contains residual reactive carboxyl functionality which impairs its chemical stability including weathering resistance as well as its electrical characteristics. The use of certain selected aliphatic monohydric alcohols for partial half esterification is preferred to plasticize the copolymer and to retain or enhance solubility of the partially half esterified copolymer in water or aqueous ammoniacal solutions. The invention provides thermoset products and external plasticizers are not usually effective. In many instances, external plasticizers are detrimental.

Any monofunctional monohydroxy organic compound may be used to form the partial half ester. Preferably, these monohydroxy organic compounds are monohydric aliphatic alcohols containing at least 3 carbon atoms and from 2–8 carbon atoms in the carbon chain which carries the single hydroxyl group. The monofunctional monohydric aliphatic alcohols which are preferred have the formula ZOH, in which Z is a monovalent radical containing only carbon, hydrogen, halogen, nitrogen, sulfur, phosphorus and ether oxygen. While methyl and ethyl alcohols are operative, they are not included within the preferred alcohols because they do not provide the best plasticizing characteristics and because solvents may be desirable to facilitate a uniform esterification reaction. On the other hand, long chain aliphatic alcohols produce copolymer esters of reduced water solubility.

While the preferred aliphatic alcohols referred to above are outstanding, especially for water application and to plasticize the maleic copolymer, the invention is not limited to these alcohols. Using any monohydroxy organic compound, the invention provides a new co-action between the partial half ester and the polyhydroxy cross-linking reactant. Selection of the monohydric alcohol is of considerable importance to water application and to plasticization of the copolymer, especially when the maleic component is copolymerized with monoethylenically unsaturated monomers such as styrene, vinyl toluene, methyl methacrylate, vinyl chloride, and mono-olefin hydrocarbons containing from 2–5 carbon atoms.

Among the aliphatic monohydric alcohols containing from 2 to 8 carbon atoms in the aliphatic carbon chain carrying the single hydroxyl group, one may desirably select saturated hydrocarbon radicals containing from 4–8 carbon atoms. These are preferably primary alcohols, including straight chain and branched chain alcohols, but tertiary and secondary alcohols as well as cyclic alcohols may be less desirably selected. Of particular value are aliphatic ether alcohols in which the hydrocarbon radical between the ether oxygen and the hydroxyl oxygen contains from 2–6 carbon atoms. The specific nature of the etherifying group remote from the single hydroxyl group is not of primary significance. Indeed, the aliphatic alcohol can be etherified with aromatic radicals and substituted aromatic radicals. To illustrate the alcohols which may be used to provide water-solubility and plasticizing characteristics, preferred alcohols are n-amyl alcohol, 1-butanol, isobutanol, 2-ethyl butanol, 2-butoxy ethanol, butyl ether of diethylene glycol and tetrahydrofurfuryl alcohol. 2-butoxy ethanol is outstanding and is particularly preferred. Other alcohols which may be selected, though these are less preferred, are 1-hexanol, 2-ethoxy ethanol, 2-phenoxy ethanol, ethyl ether of diethylene glycol, butoxy ethoxy propanol, 2-ethyl hexanol and cyclohexanol. Halogenated derivatives of the above may also be used, as for example, chlorinated isobutanol. Nitrogen-containing monohydroxy organic compounds which may be used are illustrated by tertiary amino alcohols such as N-N-dimethyl ethanol amine. Sulfur-containing monohydroxy compounds which may be used are illustrated by thio ethers such as ethyl butanol sulfide. Phosphorus-containing monohydroxy compounds which may be used are illustrated by diethyl monobutanol phosphate. While saturated alcohols are preferred, saturation is not essential. Thus, unsaturated alcohols may be used such as allyl alcohol, methallyl alcohol, ricinoleyl alcohol and oleyl alcohol. Aromatic monohydroxy compounds are illustrated by phenol and alkyl-substituted phenols such as the various cresols and tertiary butyl phenol.

The preferred monomers for copolymerization with maleic anhydride are selected from the group consisting of styrene, vinyl toluene, methyl methacrylate, vinyl chloride and mono-olefin hydrocarbons containing from 2–5 carbon atoms. With these commercially desirable monomers, the brittleness normally associated with maleic copolymers is accentuated and the preferred alcohols providing plasticizing characteristics are of particular importance to provide cross-linked copolymers from economical starting materials which are internally plasticized.

While the partially half esterified copolymers which are employed in the invention are preferably produced by partial half esterification of anhydride copolymers produced by copolymerizing a maleic anhydride with an olefinic compound copolymerizable therewith, it is possible, though less preferred, to provide the partial half esters directly through copolymerization with the olefinic compound of a mixture of the desired maleic half-esters and maleic anhydride. The copolymerization may be followed by hydrolysis of the maleic anhydride or the monomers may include both maleic half-esters and maleic or fumaric acid when water application is intended. Copolymerizations involving maleic half esters have been described in the art, but these copolymerizations and the copolymers so-produced, while broadly usable, are not entirely satisfactory. It is also feasible to produce partially half esterified copolymers which are useful in the invention by copolymerizing maleic anhydride or maleic acid with an olefinic compound copolymerizable therewith in the presence of a proportion of alcohol desired in the partial ester copolymer product which is intended. The copolymerization in the presence of alcohol proceeds more satisfactorily than direct copolymerization of the partial half ester and it appears that at least some of the esterification occurs after copolymerization has been completed.

It is desired to point out that an important purpose of the invention is to provide a controllable and limited cross-linking reaction between the partial half ester copolymer and the polyhydric alcohol. In the ordinary maleic copolymer, some of the carboxyl groups or anhydride groups are positioned in the copolymer molecule in a manner providing unusual reactivity. The unusually reactive carboxyl groups decrease storage stability and these carboxyl groups are the first to react in a cross-linking cure causing premature gelation. When the preferred copolymer partial half esters are provided by partial half esterification of preformed copolymer, the unusually reactive carboxyl groups are the ones eliminated by the partial half esterification reaction. While the existence of partial half esterification is beneficial to the polyhydric alcohol curing reaction, irrespective of how the copolymer partial half ester is produced, direct copolymerization of a mixture of half ester and anhydride or acid does not eliminate the unusually reactive carboxyl groups as effectively as does patrial half esterification of preformed copolymer. Recognition of the superior results obtained by subjecting the preferred partially half esterified preformed copolymer to cross-linking reaction with polyhydric alcohol is an important feature of the invention.

As will be evident, the inventio encompasses the use of copolymers which contain a plurality of maleic residues. These maleic residues may contain the anhydride group or, for water application, the anhydride group may be hydrolyzed and at least partially converted to the ammonium or lower alkyl-substituted ammonium salt so that the water solutions which are produced will have a pH of at least 4.0, preferably at least 6.5. Irrespective of whether the maleic residue is in the form of an anhydride or is hydrolyzed or converted to a salt with ammonium hydroxide or lower alkyl-substituted ammonium hydroxide, it will be referred to herein as an unesterified maleic residue.

The copolymer in solution in water is at least partially neutralized and has the following structural formula:

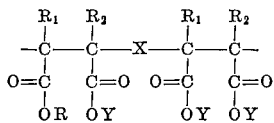

in which R is the residue of the monohydroxy organic compound used for partial half esterification, preferably selected as previously indicated; X designates an intermediate portion of the copolymer molecule consisting of maleic residues and residues of the olefin copolymerized therewith; Y is a radical selected from the group of hydrogen, ammonium radicals and alkyl-substituted ammonium radicals in which the alkyl groups contain up to 3 carbon atoms; and $R_1$ and $R_2$ are selected from the group of hydrogen, alkyl, aryl and aralkyl radicals containing up to 8 carbon atoms, and halogen.

Although the above formula shows one unesterified maleic residue and one esterified maleic residue, the formula is not intended to define proportions which are not restricted to a 1:1 ratio. The useful ratio of unesterified hereinafter.

It is desired to point out that it is essential to use at least sufficient ammonium hydroxide or alkyl-substituted ammonium hydroxide to provide a water solution having a pH of at least 4.0. Under more acid conditions water solubility of the copolymer partial half ester is not adequate. The presence of the ammonium or lower-alkyl substituted ammonium salt with the copolymer in proportions sufficient to provide a pH of at least 6.5 further increases solubility in water permitting more concentrated aqueous solutions in accordance with the invention. More ammonium hydroxide or its alkyl-substituted derivative is desirably used until the copolymer is neutralized providing a pH of from 7–9. Excess ammonium hydroxide may be tolerated and indeed, may be desirable since it frequently lowers the viscosity of the solution. It is preferred to employ ammonium hydroxide to form the ammonium salt of the partially half esterified copolymer. Lower alkyl-substituted derivatives of ammonium hydroxide which may be used to form the copolymer salt are illustrated by monoethyl ammonium hydroxide, diethyl ammonium hydroxide, triethyl ammonium hydroxide and tetramethyl ammonium hydroxide.

With the preferred copolymers of low molecular weight, e.g., copolymers of styrene and maleic anhydride having a solution viscosity in a 10% solution in acetone up to 7 centistokes, as previously defined, sufficient ammonium hydroxide may be used to provide extensive solubility in water without exceeding pH 8.5.

Any aliphatic polyhydric alcohol may be used to cross-link the partially half esterified copolymer in accordance with the invention. When the copolymer is hydrolyzed for water application, water-soluble polyhydric alcohols are desirably selected, although water-dispersible polyhydric alcohols can be used. The language "at least water-dispersible" is intended to include the more uniform distribution achieved in solution. This is not to say that particular aliphatic polyhydric alcohols may not possess outstanding attributes for particular purposes. Instead, the purpose may vary considerably with the utility under consideration and, in each instance, a polyhydric alcohol may be selected which best fits the need. Indeed, this opportunity to "tailor" the water solution coating system for its intended purpose is a feature of the invention. Primary hydroxyl groups are most reactive while secondary and tertiary groups are less reactive. If fast reaction is desired, one may select a glycol having a pair of primary hydroxyl groups. On the other hand, 2,3-butylene glycol provides a slow, delayed cure and a polypropylene glycol made from 1,2-propylene oxide supplies intermediate reactivity. Similarly, short chain polyhydric alcohols such as 1,4-butane diol provide fast curing, rigid and hard coatings whereas long chain polyalcohols and particularly polyether alcohols such as polyethylene glycol having a molecular weight of 600 provide coatings which are quite flexible and well suited to accommodate extensive fabrication. When the desired application and product properties are established for any particular utility, the selection of an appropriate polyhydric alcohol is quite straightforward.

To illustrate other aliphatic polyhydric alcohols which may be used, reference is made to trimethylol ethane, trimethylol propane, glycerol, neopentyl glycol, ethylene glycol, diethylene glycol, propylene glycol, 1,5-pentanediol, 2-methyl-2,4-pentanediol, pentaerythritol, polyvinyl alcohol, hydrolyzed or saponified copolymers of vinyl chloride and vinyl acetate, starch, sorbitol, cellulosics, and mixtures of the foregoing. Since the invention contemplates tailoring the product for its specific utility through selection of the polyhydric alcohol, mixtures are particularly desirable to provide a balance in reaction time, hardness, flexibility, elasticity, etc. It should be noted that the term "aliphatic" as applied to polyhydric alcohols is intended to denote the presence of hydroxyl groups attached to aliphatic carbon atoms in contrast with the phenolic hydroxyl group. Thus, 2,2′-bis(p-hydroxyphenylpropane) is excluded whereas dibenzyl alcohol is operative. The aliphatic polyhydric alcohols which include aromatic groups are of greatest value in non-aqueous medium and preferred polyhydric alcohols for such purpose are illustrated by the di-ether of propylene glycol with bisphenol A which may be identified as 1,1-isopropylidenebis(p-phenyleneoxy)di-2-propanol. Similarly, the di-ether of ethylene glycol with bisphenol A may also be used.

The aliphatic polyhydric alcohol functions, when the product is heated, to cross-link the copolymer through reaction with the unesterified maleic anhydride residue or, when the copolymer is hydrolyzed for water application and water is removed, through reaction with one of the pair of carboxyl groups formed by hydrolysis of the anhydride groups in the partially half esterified copolymer. The second carboxyl group of each pair is not particularly reactive with respect to the glycol cross-linking reactant just as the carboxyl group adjacent the monoester group is reasonably inert to hydroxyl functionality under normal conditions of cure.

The proportion of polyhydric alcohol cross-linking reactant is of importance to the invention. Based on the single reactive carboxyl group contained in each unesterified maleic residue in the copolymer (one of each pair of adjacent carboxyl groups in the hydrolyzed copolymer), a stoichiometric equivalence of reactive hydroxyl in the polyhydric alcohol and unesterified maleic residue in the copolymer is preferred. The ratio of hydroxyl equivalence to maleic residues may vary within the range of from 3:2 to 2:3. Outside of this range, adequate properties upon heating are not obtained. Preferably, the ratio of hydroxyl equivalence to maleic residues is from 0.75:1 to 1.25:1 and most preferably substantially 1:1. It is important to note that the stoichiometric relationship between unesterified maleic residues in the copolymer and the hydroxyl equivalence of the polyhydric alcohol ignores the second carboxyl group which is generated in each maleic residue (both esterified and unesterified) despite the fact that these less reactive carboxyl groups can be esterfied under some conditions.

It should be kept in mind in the foregoing stoichiometry that not all hydroxyl groups need be reactive. Thus, trimethylol propane may be considered to be difunctional rather than trifunctional, if free hydroxyl groups are desired in the final product.

The modifying agents which are preferred in accordance with the invention may be of two types. The first type of modifying agent is a water-soluble organic compound containing at least one methylol group. Thus, formaldehyde is a particularly desirable methylol-containing compound for use in the invention. Also, formaldehyde polymerizes to form higher molecular weight materials such as paraformaldehyde and trioxane and these may be used. Other agents, such as hexamethylenetetramine may be used.

It would appear that the methylol group is the active group since methylol and polymethylol derivatives of various compounds may be used. Thus, addition products as well as condensation products of formaldehyde with phenol, urea, melamine and benzoguanamine may be used so long as they are sufficiently water-soluble. Trimethylol phenol and alkyl-substituted derivatives of methylol phenols have been found to be operative such as para-tertiary butyl methylol phenol. Trimethylol phenol chemically is excellent, but it has certain disadvantages which are tolerable in some utilities, these disadvantages being poor color and a lack of storage stability. Methylol derivatives of melamine such as mono-, di-, tri- and hexamethylol melamine may be used. Trimethylol melamine and alkylated trimethylol melamines are particularly desirable in providing hard finishes. Water-soluble methylol ureas including monomethylol urea, dimethylol urea and intermediate condensation products of methylol ureas retaining water-solubility may be used. Similarly, mono- and polymethylol guanamines are usuable. The methylol group may be blocked with a methyl ether which breaks down under baking conditions when storage instability is encountered, e.g., the trimethyl ether of trimethylol melamine.

The methylol-containing compound is employed in an amount corresponding to the relatively non-reactive carboxyl groups in the copolymer. Thus, stoichiometric quantities providing one methylol group for each of the relatively non-reactive carboxyl groups in the copolymer (the maleic residues including the half esterified maleic residues) is preferred. Broadly, one should use sufficient methylol-containing compound to supply at least 0.5 methylol group for each maleic residue in the copolymer. If the methylol-containing compound is non-volatile, not more than a 100% excess, based on stoichiometry, should be used. However, some methylol-containing compounds, especially formaldehyde, are volatile and any excess is merely eliminated during the bake. Preferably, the methylol-containing compound is used in an amount to supply from 0.75 to 1.25 methylol groups per maleic residue in the copolymer.

A second type of modifying agent is an amine, including alcohol amines. Monoamines and lower alcohol derivatives thereof such as mono-, di-, and triethanol amine are preferred. Propanol amines such as mono-, di-, and triisopropanol amines are usuable. Methyl, ethyl, propyl, butyl and isobutyl amines are also usable such as mono-, di-, and triethyl amines and mono-, di-, and tripropyl amines. t-Butyl amine is a desirable amine for selection in accordance with the invention. Polyamines may be used, but are less preferred for they tend to precipitate the copolymer from water solution. Mono-ethanol amine is particularly preferred. Also, preferred amines boil in the range of 100–300° C.

It is preferred, in accordance with the invention, to employ the ammonium salt to enhance water-solubility of the partially half esterified copolymer. When the ammonium salt is employed, any of the amine-modifying agents referred to above may be employed since all of these are less volatile than ammonia. On the other hand, when the partially half esterified copolymer is converted to a lower alkyl-substituted ammonium salt, the amine employed as the modifier should have a higher boiling point than the alkyl-substituted amine used in the preparation of the copolymer salt, e.g., the amine should be less volatile than the alkyl-substituted ammonium compound which is released when the copolymer salt is subjected to elevated temperature.

The organic amine modifying agent is employed in an amount corresponding to the reactive carboxyl groups in the copolymer. Since the amine modifier is not intended to function as a cross-linking agent, there is preferably provided in the water medium one molecule of amine for each reactive carboxyl group in the copolymer (for each unesterified maleic residue in the copolymer). Broadly, one should use sufficient amine to provide at least 0.5 mol. of amine per equivalent of unesterified maleic residue in the copolymer. If the amine is not easily evaporated, not more than 2 mols of amine per maleic residue equivalent should be used. Preferably, the amine is present in the water medium in an amount of from 0.75–1.25 mol of amine per equivalent of unesterified maleic residue in the copolymer.

The partially half esterified maleic copolymers, in accordance with the invention, may be simply mixed with appropriate proportions of aliphatic polyhydric alcohols to form molding compositions. On the other hand, coating and impregnating compositions can be formulated by placing the mixture in a common solvent medium to facilitate application. Aqueous solutions containing the hydrolyzed partially half esterified copolymer or preferably the ammonium salt thereof have previously been discussed. However, the mixtures of the invention containing the partially half esterified maleic copolymer as a polyanhydride may be placed in organic solvent solution.

Broadly, any organic solvent which is a solvent for the partially half esterified copolymer as well as the aliphatic polyhydric alcohol which is selected as the cross-linking reactant may be used. It is particularly preferred to employ oxygenated hydrocarbon solvents and particularly ketones such as acetone, methyl ethyl ketone and methyl isobutyl ketone either alone or in admixture with other organic solvents.

The solutions may be applied in any suitable manner as by brushing, spraying, roller coating, etc., and the solvent evaporated to form a film. The deposited film is then cured by the application of heat, temperatures in excess of about 110° C. being suitable for curing, the time of heating being inversely proportional to the temperature which is selected.

It should be noted that with more reactive glycols, such as 1,4-butane diol, the dry but unheated film will cure, even at room temperature after a day or more. With less reactive glycols, much longer times are required for cures at room temperature.

As previously indicated, the mixtures of the invention may be used as such for molding or these mixtures may be applied from solvent medium to form clear or pigmented coatings. The coatings of the invention are adherent to metal, may be used as can coatings, appliance finishes, and wire coatings, it being understood that the mixtures deposited in accordance with the invention are preferably heated to cure the same. The mixtures of the invention, applied from solution, are also of value for coating porous substrates such as wood and paper and for the preparation of pre-impregnated materials for molding and laminating. These mixtures may also be used as binders for fibrous materials, e.g., to bond together fibrous webs or mats. The mixtures of the invention may also be employed as an adhesive, this being illustrated by the production of plywood in which the composition of the invention may be employed to bind together the several laminae constituting the plywood. The solutions of the invention are also adapted, particularly the water solutions, for use in the treatment of textiles to improve crease resistance and water resistance of the textile which is treated. For textile fibers or films containing reactive hydroxyl groups, such as cellulosics, polyvinyl alcohol, etc., all or a portion of the cross-linking polyhydric alcohol may be omitted in order to obtain reaction of the partially half esterified copolymer with the cellulosic molecule, thus permanently altering the fiber or film. Such treatment is of importance for dyeing, crease-resistance, stain and soil resistance, etc.

The invention is illustrated in the examples which follow in which the invention is shown in conjunction with a low molecular weight copolymer of styrene and maleic anhydride in substantially equal molecular quantities, such a copolymer constituting a preferred embodiment of the invention.

Example I

A kettle of 30 gallon capacity, provided with agitation equipment, a jacket adapted to provide heating or cooling and a reflux condenser was charged with approximately 7 gallons of p-cymene which was then heated to the boiling point (about 176° C.).

In a separate tank, approximately 17.6 pounds of maleic anhydride briquettes were dissolved in approximately 13 gallons of p-cymene. The maleic anhydride-p-cymene solution was heated to 53° C. and after the briquettes disappeared the solution was filtered to recover ¾ pound of insoluble maleic acid. Approximately 18.3 pounds of styrene monomer were added to the clear filtrate, representing approximately 1% excess by weight over a 1:1 molar ratio of styrene to maleic anhydride. After stirring to produce a homogeneous solution and cooling to 48° C., 390 grams of benzoyl peroxide were added and dissolved by stirring to provide approximately 2.4% benzoyl peroxide by weight of total monomers present.

The monomer-containing solution was added to the boiling p-cymene in the kettle at the rate of about 3 gallons per minute. The copolymerization reaction was substantially instantaneous. After the 15 gallons of monomer-containing solution had been added, the molten mass of heteropolymer product which formed within the kettle was allowed to settle to the bottom of the kettle where it was drawn off. The molten product was allowed to cool to form a solid mass which was air dried and broke up into particulate form. The yield was 111.5%, indicative of complete reaction of monomer as well as termination of the copolymer by p-cymene. The copolymer product was soluble in acetone and 10 grams of the copolymer dissolved in acetone to form 100 milliliters of solution had a viscosity of 0.72 centistoke.

Example II

The particulate copolymer produced in Example I was ball milled with sufficient 2-butoxy ethanol to form the 60% half ester and the mixture was heated at 165–175° C. for 2 hours. As the mixture was heated, it melted and was mechanically stirred. On cooling, the reaction product solidified to form a clear, brittle, friable mass which was pulverized. The yield was essentially quantitative. The reaction was effected in a vessel equipped with a reflux condenser so that vaporized unreacted alcohol could be condensed and returned to the reaction mixture until the reaction was completed. The acid number of the esterified product corresponded to the theoretical value.

Example III 250 grams of the partially esterified product of Example II were stirred into 250 grams of water to wet the copolymer and 75 grams of a 58% water solution of ammonium hydroxide were added with stirring while the mixture was heated to 40° C. The 40° C. temperature was maintained for a period of from 30–60 minutes to provide a clear solution having a pH of 7.8.

Example IV

Example III was repeated using 202 grams of the copolymer product of Example I in place of the partial half ester of Example II, 185 grams of water, and 121 grams of 58% ammonium hydroxide to provide a further solution having a pH of 7.8.

Example V

The water solutions of Examples III and IV were mixed with sufficient 1,4-butane diol to provide 0.5 mol of diol for each unesterified maleic residue in the copolymer. The solutions so provided were coated on tinplate and cured by baking for 10 minutes at 150° C. to provide cured films having a weight of 5 milligrams per square inch. The coatings produced using the water solution of the partially half esterified copolymer of Example III were more tightly adherent, possessed greater insolubility and better resisted salt spray than the corresponding product produced using the water solution of unesterified copolymer of Example IV.

Example VI

Example V was repeated with the exception that the 1,4-butane diol was added to an organic solvent solution containing 25% by weight of the copolymer of Example I or its partially half esterified derivative of Example II dissolved in methyl ethyl ketone. The partially half esterified product of Example II provided a superior film on the tinplate, adhesion, flexibility, resistance to chemical reagents such as solvent attack and to weathering all being substantially improved.

*Example VII*

The water solution of Example III was modified by the addition thereto of paraformaldehyde in an amount to provide 1 mol of formaldehyde for each equivalent of maleic residue (including the half esterified maleic residues). The so-modified water solution in admixture with 1,4-butane diol formed superior films when applied to tinplate and baked as indicated in Example V, in comparison with the unmodified water solution containing the partially half esterified copolymer tested in Example V.

*Example VIII*

Example VII was repeated using ⅓ mol of trimethylol melamine in place of the 1 mol of formaldehyde used in Example VII. When the modified water solution was tested as in Example V, the solvent resistance and weathering resistance were improved by the addition of trimethylol melamine and the hardness of the film was significantly enhanced.

*Example IX*

Example VII was repeated with the exception that the water solution of Example III was modified by the addition of monoethanol amine instead of paraformaldehyde. The monoethanol amine was added to the solution of Example III in an amount to provide 1 mol of monoethanol amine for each equivalent of unesterified maleic residue in the copolymer. When the monoethanol amine modified solution was compared with the unmodified solution as tested in Example V, the monoethanol amine modified film cured to greater water resistance, solvent resistance, and provided superior resistance to weathering.

*Example X*

A resin kettle was set up with stirrer, reflux condenser, oil bath and thermometer for temperature control. To the reaction kettle were added 202 grams of the copolymer of Example I and 59 grams of 2-butoxy ethanol. These were mixed well and heat was applied to the oil bath while the reaction mixture was stirred. The temperature of the oil bath was increased to 180–190° C. at which time the reaction mixture was fluid. The copolymer of Example I and 2-butoxy ethanol were allowed to react for approximately 2 hours at which time the acid number was substantially the same as the theoretical calculated value for the partially half esterified copolymer. The oil bath was then removed and the product solidified on cooling. The solid partial half ester was then mortar mixed to provide a uniform powder.

*Example XI*

The partial half ester of 2-butoxy ethanol prepared in Example X was then hydrolyzed with ammonium hydroxide as follows:

To a reaction flask equipped with stirrer were added 261 grams of the 2-butoxy ethanol partial half ester of Example X and 239.5 grams of water. The mixture was stirred well and 90.5 grams (100 milliliters) of 58% ammonium hydroxide water solution were then added. Stirring was continued until a clear solution was obtained having a pH of 8.2. Heat may be applied to hasten solution time. The solution may be tested for complete hydrolysis by adding a few drops to 2–5 milliliters of water in a test tube, the complete hydrolysis of the partial half ester being established by retention of solubility in the dilute water medium.

*Example XII*

The preparation of a final coating solution using ethanolamine as the modifier was provided by thoroughly mixing the following:

| | Grams |
|---|---|
| Aqueous ammoniacal partial half ester solution (Example XI) | 591 |
| Polyethylene glycol (molecular weight 600) | 135 |
| Ethanolamine | 15 |
| Water | 150 |

*Example XIII*

Example I was repeated with the exception that in place of p-cymene there is used as copolymerization solvent an aromatic naphtha having a reflux temperature of 195–200° C. and a distillation range of from 193–245° C. As in Example I, the copolymer preparation was carried out under reflux conditions and the product of this Example had a viscosity of 0.59 centistoke measured in a solution containing 10 grams of the copolymer dissolved in acetone to form 100 milliliters of solution.

*Example XIV*

A resin kettle was set up with stirrer, reflux condenser, oil bath and thermometer for temperature control. To the reaction kettle were added 202 grams of the copolymer of Example XIII and 81 grams of butyl ether of diethylene glycol. These were mixed well and heat was applied to the oil bath while the reaction mixture was stirred. The temperature of the oil bath was increased to 180–190° C. at which time the reaction mixture was fluid. The copolymer of Example XIII and butyl ether of diethylene glycol were allowed to react for approximately 2 hours, at which time the acid number was substantially theoretical calculated value for the polymer. The oil bath was then removed and the product solidified on cooling. The solid partial half ester was mortar mixed to a uniform powder.

*Example XV*

The partial half ester of butyl ether of diethylene glycol produced in Example XIV was then hydrolyzed with ammonium hydroxide as follows:

To a reaction flask equipped with stirrer were added 283 grams of the butyl ether of diethylene glycol partial half ester and 261.5 grams of water. The mixture was stirred well and 90.5 grams (100 milliliters) of 58% ammonium hydroxide were then added. Stirring was continued until a clear solution was obtained having a pH of 7.9. Heat may be applied to hasten solution time. The solution was tested for complete hydrolysis by adding a few drops to 2–5 milliliters of water in a test tube, the complete hydrolysis of the partial half ester being established by retention of solubility in the dilute water medium.

*Example XVI*

A coating solution using triethanolamine as modifier was provided by thoroughly mixing the following:

| | Grams |
|---|---|
| Aqueous ammoniacal solution of Example XV | 635 |
| Polyethylene glycol (molecular weight 600) | 135 |
| Triethanolamine | 35 |
| Water | 170 |

*Example XVII*

A resin kettle was set up with stirrer, reflux condenser, oil bath and thermometer for temperature control. To the resin kettle were added 202 grams of the copolymer of Example XIII and 55.5 grams of n-butanol. These were mixed well and heat was applied to the oil bath while the reaction mixture was stirred. The temperature of the oil bath was increased to 180–190° C. at which time the reaction mixture was fluid. The copolymer of Example XIII and n-butanol were allowed to react for approximately 2 hours providing a substantially complete reaction to produce an approximately 75% n-butanol partial half ester. The oil bath was then removed and the product solidified on cooling. The solid partial half ester was mortar mixed to a uniform powder.

*Example XVIII*

The partial half ester of n-butanol of Example XVII was then hydrolyzed with ammonium hydroxide as follows:

To a reaction flask equipped with a stirrer were added 257.5 grams of the n-butanol partial half ester and 233.5 grams of water. The mixture was stirred well and 75.5 grams (83.9 milliliters) of 58% ammonium hydroxide solution were then added. Stirring was continued until a clear solution was obtained having a pH of 8.3. Heat was applied to hasten solution time.

*Example XIX*

A final coating solution using trimethylol melamine modifier was provided by thoroughly mixing the following:

|  | Grams |
|---|---|
| Aqueous ammoniacal solution of Example XVIII | 566.5 |
| Polyethylene glycol (molecular weight 600) | 135 |
| Trimethylol melamine (80% solids solution in water) | 90 |
| Water | 189 |

*Example XX*

Example XVII was repeated using 76.5 grams of tetrahydrofurfuryl alcohol. The product was an approximately 75% tetrahydrofurfuryl alcohol partial half ester.

*Example XXI*

The partial half ester of tetrahydrofurfuryl alcohol of Example XX was then hydrolyzed with ammonium hydroxide as follows:

To a reaction flask equipped with stirrer were added 278.5 grams of the tetrahydrofurfuryl alcohol partial half ester and 254.5 grams of water. The mixture was stirred well and 75.5 grams (83.9 milliliters) of 58% ammonium hydroxide solution were then added. Stirring was continued until a clear solution was obtained having a pH of 7.6.

*Example XXII*

A final coating solution using trimethylol phenol modifier was provided by thoroughly mixing the following:

|  | Grams |
|---|---|
| Aqueous ammoniacal solution of Example XXI | 608.5 |
| Polyethylene glycol (molecular weight 600) | 135 |
| Trimethylol phenol (70% solids solution in water) | 87 |
| Water | 169.8 |

*Example XXIII*

Example XIV was repeated using 88 grams of butoxy ethoxy propanol to provide an approximately 50% butoxy ethoxy propanol partial half ester.

*Example XXIV*

The partial half ester of butoxy ethoxy propanol prepared in Example XXIII was then hydrolyzed with ammonium hydroxide as follows:

To a reaction flask equipped with stirrer were added 290 grams of the butoxy ethoxy propanol partial half ester and 268.5 grams of water. The mixture was stirred well and 90.5 grams (100 milliliters) of 58% ammonium hydroxide solution were then added. Stirring was continued until a clear solution was obtained having a pH of 7.2.

*Example XXV*

A final coating solution using a methylol-containing urea modifier was provided by thoroughly mixing the following:

|  | Grams |
|---|---|
| Aqueous ammoniacal solution of Example XXIV | 649 |
| Polyethylene glycol (molecular weight 600) | 135 |
| Methylol urea (a 40.4% water solution of a thermosetting methylol urea-ammonia-formaldehyde reaction product containing 2.3 mols of formaldehyde, 1 mol of urea and 0.5 mol of ammonia having a pH of 7.5 and a specific gravity measured at 25/25° C. of 1.17) | 150 |
| Water | 107 |

The invention is defined in the claims which follow.

I claim:

1. A mixture comprising (A) a partially half esterified copolymer selected from the group consisting of (1) partially esterified copolymers of styrene and maleic anhydride produced by copolymerizing a maleic compound with olefinic compound copolymerizable therewith and having the formula:

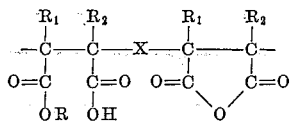

in which R is the organic residue of monofunctional monohydroxy organic compound, $R_1$ and $R_2$ are selected from the group consisting of hydrogen, alkyl, aryl and aralkyl radicals containing up to 8 carbon atoms and halogen, and X designates an intermediate portion of the copolymer molecule, (2) copolymers having said formula at least partially neutralized with ammonium hydroxide and (3) copolymers having said formula at least partially neutralized with lower alkyl-substituted ammonium hydroxide in which the alkyl groups contain up to 3 carbon atoms, said monohydroxy organic compound esterifying one of the carboxyl groups in from 10–80% of the maleic residues available in said copolymer and (B) aliphatic polyhydric alcohol in an amount providing a ratio of hydroxyl equivalence in said polyhydric alcohol to unesterified maleic residues in said partially half esterified copolymer within the range of from 3:2 to 2:3, said copolymers of styrene and maleic anhydride having a solution viscosity measured at 25° C. in a 10% solution in acetone of up to 7 centistokes and being produced by copolymerizing styrene and maleic anhydride in molar proportions of from 1:2 to 2:1.

2. A mixture as recited in claim 1 in which the monohydroxy compound partially esterifying one of the carboxyl groups in some of the maleic residues of said copolymer is an aliphatic monohydric alcohol containing at least 3 carbon atoms and has the formula ZOH in which Z is a monofunctional monovalent radical in which the only atoms which are present are selected from the group consisting of hydrogen, halogen, nitrogen, sulfur, phosphorus and ether oxygen and the aliphatic carbon chain carrying the single hydroxy group contains from 2–8 carbon atoms.

3. A mixture as recited in claim 1 in which said monohydroxy organic compound esterifies one of the carboxyl groups in from 40–75% of the maleic residues available in said partially half esterified copolymer.

4. A mixture as recited in claim 1 in which the ratio of hydroxyl equivalence provided by said polyhydric alcohol to unesterified maleic residues in said partially half esterified copolymer is within the range of 0.75:1 to 1.25:1.

5. An organic solvent solution containing dissolved therein (A) a partially half esterified copolymer of styrene and maleic anhydride produced by copolymerizing a maleic compound with olefinic compound copolymerizable therewith and having the formula:

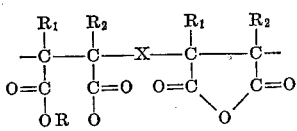

in which R is the organic residue of monofunctional monohydroxy organic compound, $R_1$ and $R_2$ are selected from the group consisting of hydrogen, alkyl, aryl and aralkyl radicals containing up to 8 carbon atoms and halogen, and X designates an intermediate portion of the copolymer molecule, said monohydroxy organic compound esterifying one of the carboxyl groups in from 10–80% of the maleic residues available in said copolymer, and (B) aliphatic polyhydric alcohol in an amount providing a ratio of hydroxyl equivalence in said polyhydric alcohol to unesterified maleic anhydride residues in said partially half esterified copolymer within the range of from 3:2 to 2:3, said copolymer of styrene and maleic anhydride having a solution viscosity measured at 25° C. in a 10% solution in acetone of up to 7 centistokes and being produced by copolymerizing styrene and maleic anhydride in molar proportions of from 1:2 to 2:1.

6. A water solution having a pH of at least 4.0 and containing dissolved therein (A) an at least partially neutralized partially half esterified copolymer of styrene and maleic anhydride produced by copolymerizing a maleic compound with olefinic compound copolymerizable therewith and having the formula:

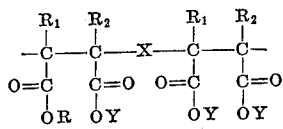

in which R is the organic residue of monofunctional aliphatic monohydric alcohol having not more than 8 carbon atoms in the carbon chain carrying the hydroxyl group of said monohydric alcohol, $R_1$ and $R_2$ are selected from the group consisting of hydrogen, alkyl, aryl and aralkyl radicals containing up to 8 carbon atoms and halogen, X designates an intermediate portion of the copolymer molecule, and Y is a radical selected from the group consisting of hydrogen, ammonium, and alkyl-substituted ammonium in which the alkyl groups contain up to 3 carbon atoms, said monohydric aliphatic alcohol esterifying one of the carboxyl groups in from 10–80% of the maleic residues available in said copolymer, and (B) at least water-dispersible aliphatic polyhydric alcohol in an amount providing a ratio of hydroxyl equivalence in said polyhydric alcohol to unesterified maleic residues in said partially half esterified copolymer within the range of from 3:2 to 2:3, said copolymer of styrene and maleic anhydride having a solution viscosity measured at 25° C. in a 10% solution in acetone of up to 7 centistokes and being produced by copolymerizing styrene and maleic anhydride in molar proportions of from 1:2 to 2:1.

7. A water solution as recited in claim 6 in which the aliphatic monohydric alcohol partially esterifying one of the carboxyl groups in some of the maleic residues of said copolymer is an ether alcohol in which the single hydroxyl group is carried by the carbon chain of a saturated hydrocarbon radical containing from 2–6 carbon atoms.

8. A water solution as recited in claim 7 in which the ether alcohol is 2-butoxy ethanol.

9. A water soluiton as recited in claim 7 in which said aliphatic monohydric alcohol esterifies one of the carboxyl groups in from 40–75% of the maleic residues available in said partially half esterified copolymer.

10. A water solution as recited in claim 7 in which the ratio of hydroxyl equivalence provided by said polyhydric alcohol to unesterified maleic residues in said partially half esterified copolymer is within the range of 0.75:1 to 1.25:1.

11. A water solution as recited in claim 7 in which said partially half esterified copolymer is approximately neutralized with ammonium hydroxide.

12. A water solution having a pH of at least 4.0 and containing dissolved therein (A) an at least partially neutralized partially half esterified copolymer of styrene and maleic anhydride produced by copolymerizing a maleic compound with olefinic compound copolymerizable therewith and having the formula:

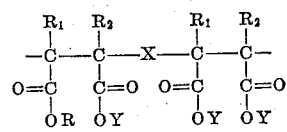

in which R is the organic residue of monofunctional aliphatic monohydric alcohol having not more than 8 carbon atoms in the carbon chain carrying the hydroxyl group of said monohydric alcohol, $R_1$ and $R_2$ are selected from the group consisting of hydrogen, alkyl, aryl and aralkyl radicals containing up to 8 carbon atoms and halogen, X designates an intermediate portion of the copolymer molecule, and Y is a radical selected from the group consisting of hydrogen, ammonium and alkyl-substituted ammonium in which the alkyl groups contain up to 3 carbon atoms, said monohydric aliphatic alcohol esterifying one of the carboxyl groups in from 10–80% of the maleic residues available in said copolymer, (B) at least water-dispersible aliphatic polyhydric alcohol in an amount providing a ratio of hydroxyl equivalence in said polyhydric alcohol to unesterified maleic residues in said partially half esterified copolymer within the range of from 3:2 to 2:3, and (C) a water soluble organic compound containing at least one methylol group in an amount providing at least 0.5 methylol group for each maleic residue in the copolymer, said copolymer of styrene and maleic anhydride having a solution viscosity measured at 25° C. in a 10% solution in acetone of up to 7 centistokes and being produced by copolymerizing styrene and maleic anhydride in molar proportions of from 1:2 to 2:1.

13. A water solution as recited in claim 12 in which said organic compound containing at least one methylol group is non-volatile and is present in an amount to supply not more than 2.0 methylol groups per maleic residue in the copolymer.

14. A water solution as recited in claim 12 in which said organic compound containing at least one methylol group is present in an amount to supply from 0.75 to 1.25 methylol groups per maleic residue in the copolymer.

15. A water solution as recited in claim 14 in which said organic compound containing at least one methylol group is formaldehyde.

16. A water solution as recited in claim 14 in which said organic compound containing at least one methylol group is selected from the group consisting of addition products and condensation products of formaldehyde with a compound selected from the group consisting of phenol, urea, melamine and benzoguanamine.

17. A water solution having a pH of at least 4.0 and containing dissolved therein (A) an at least partially neutralized partially half esterified copolymer of styrene and maleic anhydride produced by copolymerizing a maleic compound with olefinic compound copolymerizable therewith and having the formula:

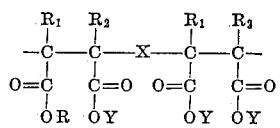

in which R is the organic residue of monofunctional aliphatic monohydric alcohol having not more than 8 carbon atoms in the carbon chain carrying the hydroxyl group of said monohydric alcohol, $R_1$ and $R_2$ are selected from the group consisting of hydrogen, alkyl, aryl and aralkyl radicals containing up to 8 carbon atoms and halogen, X designates an intermediate portion of the copolymer molecule, and Y is a radical selected from the group consisting of hydrogen, ammonium, and alkyl-substituted ammonium in which the alkyl groups contain up to 3 carbon atoms, said monohydric aliphatic alcohol esterifying one of the carboxyl groups in from 10–80% of the maleic residues available in said copolymer, (B) at least water-dispersible aliphatic polyhydric alcohol in an amount providing a ratio of hydroxyl equivalence in said polyhydric alcohol to unesterified maleic residues in said partially half esterified copolymer within the range of from 3:2 to 2:3, and (C) an organic amine less volatile than the radical selected for Y in an amount providing at least 0.5 mol of amine for each equivalent of unesterified maleic residue in the copolymer, said copolymer of sytrene and maleic anyhdride having a solution viscosity measured at 25° C. in a 10% solution in acetone of up to 7 centistokes and being produced by copolymerizing styrene and maleic anhydride in molar proportions of from 1:2 to 2:1.

18. A water solution as recited in claim 17 in which Y is ammonium radical and said amine boils in the range of 100–300° C.

19. A water solution as recited in claim 17 in which said amine is present in an amount to supply from 0.75 to 1.25 mols of amine per equivalent of unesterified maleic residue in the copolymer.

20. A water solution as recited in claim 17 in which said amine is monoethanol amine.

21. A thermoset product comprising a heat-cured mixture comprising (A) a partially half esterified copolymer of styrene and maleic anyhydride produced by copolymerizing a maleic compound with olefinic compound copolymerizable therewith and selected from the group consisting of 1 copolymers having the formula:

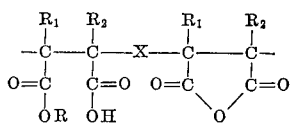

in which R is the organic residue of monofunctional monohydroxy organic compound, $R_1$ and $R_2$ are selected from the group consisting of hydrogen, alkyl, aryl and aralkyl radicals containing up to 8 carbon atoms, and halogen, and X designates an intermediate portion of the copolymer molecule, (2) copolymers having said formula at least partially neutralized with ammonium hydroxide and (3) copolymers having said formula at least partially neutralized with lower alkyl-substituted ammonium hydroxide in which the alkyl groups contain up to 3 carbon atoms, said monohydroxy organic compound esterifying one of the carboxyl groups in from 10–80% of the maleic residues available in said copolymer and (B) aliphatic polyhydric alcohol in an amount providing a ratio of hydroxyl equivalence in said polyhydric alcohol to unesterified maleic residues in said partially half esterified copolymer within the range of from 3:2 to 2:3, said copolymer of styrene and maleic anhydride having a solution viscosity measured at 25° C. in a 10% solution in acetone of up to 7 centistokes and being produced by copolymerizing styrene and maleic anyhdride in molar proportions of from 1:2 to 2:1.

22. A thermoset product comprising a heat-cured mixture comprising (A) an at least partially neutralized partially half esterified copolymer of styrene and maleic anhydride produced by copolymerizing a maleic compound with olefinic compound copolymerizable therewith and having the formula:

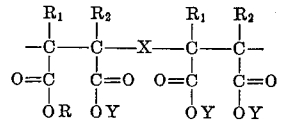

in which R is the organic residue of monofunctional aliphatic monohydric alcohol having not more than 8 carbon atoms in the carbon chain carrying the hydroxyl group of said monohydric alcohol, $R_1$ and $R_2$ are selected from the group consisting of hydrogen, alkyl, aryl and aralkyl radicals containing up to 8 carbon atoms and halogen, X designates an intermediate portion of the copolymer molecule and Y is a radical selected from the group consisting of hydrogen, ammonium, and alkyl-substituted ammonium in which the alkyl groups contain up to 3 carbon atoms, said monohydric aliphatic alcohol esterifying one of the carboxyl groups in from 10–80% of the maleic residues available in said copolymer, (B) at least water-dispersible aliphatic polyhydric alcohol in an amount providing a ratio of hydroxyl equivalence in said polyhydric alcohol to unesterified maleic residues in said partially half esterified copolymer within the range of from 3:2 to 2:3, and (C) a water soluble organic compound containing at least one methylol group in an amount providing at least 0.5 methylol group for each maleic residue in the copolymer, said copolymer of styrene and maleic anhydride having a solution viscosity measured at 25° C. in a 10% solution in acetone of up to 7 centistokes and being produced by copolymerizing styrene and maleic anhydride in molar proportions of from 1:2 to 2:1.

23. A thermoset product comprising a heat-cured mixture comprising (A) an at least partially neutralized partially half esterified copolymer of styrene and maleic anhydride produced by copolymerizing a maleic compound with olefinic compound copolymerizable therewith and having the formula:

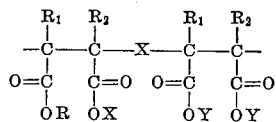

in which R is the organic residue of monofunctional aliphatic monohydric alcohol having not more than 8 carbon atoms in the carbon chain carrying the hydroxyl group of said monohydric alcohol, $R_1$ and $R_2$ are selected from the group consisting of hydrogen, alkyl, aryl and aralkyl radicals containing up to 8 carbon atoms and halogen, X designates an intermediate portion of the copolymer molecule and Y is a radical selected from the group consisting of hydrogen, ammonium, and alkyl-substituted ammonium in which the alkyl groups contain up to 3 carbon atoms, said monohydric aliphatic alcohol esterifying one of the carboxyl groups in from 10–80% of the maleic residues available in said copolymer, (B) at least water-dispersible aliphatic polyhydric alcohol in an amount providing a ratio of hydroxyl equivalence in said polyhydric alcohol to unesterified maleic residues in said partially half esterified copolymer within the range of from 3:2 to 2:3, said mixture of (A) and (B) being heat-cured in the presence of (C) an organic amine in an amount providing at least 0.5 mol of amine for each equivalent of unesterified maleic residue in the partially half esterified copolymer of component (A), said copolymer of styrene and maleic anhydride having a solution viscosity measured at 25° C. in a 10% solution in acetone of up to 7 centistokes and being produced by copolymerizing styrene and maleic anhydride in molar proportions of from 1:2 to 2:1.

References Cited by the Examiner
UNITED STATES PATENTS

| | | | |
|---|---|---|---|
| 2,324,739 | 7/1943 | Stoops et al. | 260—78.5 |
| 2,870,128 | 1/1959 | Sellers | 260—78.5 |
| 2,871,213 | 1/1959 | Graulich et al. | 260—29.4 |
| 2,977,334 | 3/1961 | Zopf | 260—78.5 |

MURRAY TILLMAN, *Primary Examiner.*

DANIEL ARNOLD, LEON J. BERCOVITZ, *Examiners.*